June 1, 1954          D. FLATH          2,680,013

VEHICLE LOAD WEIGHING DEVICE

Filed March 24, 1952

INVENTOR.

David Flath

BY

Patented June 1, 1954

2,680,013

UNITED STATES PATENT OFFICE 2,680,013

VEHICLE LOAD WEIGHING DEVICE

David Flath, Oregon City, Oreg.

Application March 24, 1952, Serial No. 278,220

2 Claims. (Cl. 265—40)

My invention relates to a weighing device or scale for attachment to either the truck or the trailer of a logging vehicle in order to give a ready indication of the weight of the load carried thereby.

One object of my invention is to provide, in combination with the subframe and the bunk of a logging vehicle, a pressure actuated scale which accurately will indicate the weight of the logs loaded upon the bunk and carried by the subframe, the fabrication and installation cost of the scale being kept to a minimum in order that the sale thereof may be competitive with other scales now upon the market.

In the large timber producing regions of the United States and Canada and, more particularly, in the Pacific Northwest, a majority of all timber and log hauling from forest to mill is done by massive truck and trailer logging vehicles. In essence, the trailer portion of such a vehicle consists of little more than a skeleton-like, dual-axled bolster and subframe carrying a cross bunk. Longitudinally, the trailer is equipped with a hollow tunnel through which an enlongated wood or metal reach is fitted, the reach in turn articulating forwardly with the truck or powered towing unit. Thus, when it is remembered that such skeletal vehicle may weigh 30 to 35 tons when loaded, it will be apparent what a small proportion of that weight can be attributed to the vehicle tare weight.

Returning to the "forest to mill" log hauling operations so common in the Pacific Northwest, such operations make frequent and repeated use of the public highways. As is evident, however, these highways were and still are built to a minimal or to little better than a passenger vehicle support strength because of the cost involved. At the same time, much of the logging originates in remote back country areas having bituminous surfaced roads while the log dumps, mills or pulp wood plants are located in more centralized areas, many having concrete roads. The roads intermediate these areas and, in fact, a good portion of the total highway mileage of the region cannot and does not stand up under the wear and pounding imposed by continuous logging vehicle use. In short, once the logging trucks begin to use a bituminous or a secondary highway, their massive gross weight accelerates deterioration and break down of the surface. For the above reasons and in order to maintain the highways in as good condition as is practical, most of the State and Provincial legislatures in these regions have passed laws limiting the height, width, and length of logging vehicles, severely limiting the weight which may be carried while traveling upon the public highways.

By way of example, the State of Oregon limits the overall gross weight of a logging vehicle, the tandem axle gross weight, the gross weight per axle, and the gross weight per wheel. A log truck having the first and last axles spaced 38 feet or less is allowed a permissible gross weight of 66,300 pounds and one in which this distance is 32 feet is allowed a gross weight of 61,200 pounds. At the same time, however, unless a special permit is issued by the Oregon State Highway Commission, the gross individual wheel weight may not exceed 9,000 to 9,500 pounds, the gross individual axle weight 18,000 to 19,0000 pounds and the gross tandem axle weight 32,000 to 34,000 pounds. Penalties for violation of these weight limitations are quite severe and, because of the nature of the log hauling business, have a vital effect upon the economic well being of the entire timber producing region. That is to say, most log haulers either are independent contractors or are employees of an independent contractor who owns his own rigs. Violations of the weight limitations are not willful. However, the independent contractor is paid by the total weight which he hauls. Accordingly, it is his natural desire to haul the maximum permissible load. On the other hand, his first weight violation may carry a penalty consisting of a $50.00 fine, his second a 30 day license revocation, and his third a permanent license revocation. To make a fair living, the average log hauler must work from sunup to sundown each day permitted by the highway regulations. Accordingly, revocation or loss of his license is a severe penalty which the log hauler seeks to avoid if at all possible and, if such penalties are over abundant, the economy of the region suffers.

For the above reasons, a number of log trucks today are equipped with one type of scale or weighing device or another. Some of these scales are crude affairs which measure the deflection of each bolster spring on the trailer and on the truck. Others are placed intermediate the bunk and the subframe of the vehicle while still others work on the rub plates at the sides of the vehicle. Each of these scales, however, is possessed of certain inherent disadvantages, it being one object of my invention to overcome these disadvantages by the provision of an improved, pressure actuated scale.

To the above ends, the construction of a typical logging vehicle and the manner of loading logs first must be appreciated. Thus, a conventional log trailer consists of a tandem or a dual axle vehicle having a subframe which rides on bolster springs. At the center of the subframe, a king bolt or journalled pivot rotatably connects a lateral bunk to the subframe and the margins of this bunk ride upon rub plates when the vehicle is loaded. As is apparent, those scales which measure the deflection of the bolster springs require two readings since one scale can indicate the deflection of but one spring. Further, such deflection scales are difficult to calibrate and to maintain in operating condition due to the severe pounding and the rugged use to which a logging vehicle is put, a great deal of this severe usage originating in travel through the woods before reaching the public highway.

Turning now to the manner in which logs are loaded and ride upon a logging vehicle, the disadvantages of other prior scales becomes apparent. Thus, a fully loaded bunk is mounted, pivotally, at the center point and slidably is held up at the lateral sides thereof by rub plates, that rub plate being effective which corresponds to the most heavily loaded side of the vehicle. When the truck or trailer unit first is assembled, the relationship of the bunk to the rub plates is calculated and arranged so that a majority of the weight upon the unit is taken, through the center of the bunk and the king pin or pivot assembly rather than through the rub plates. Accordingly, any prior weighing device which has been interposed between the bunk and subframe has been inefficient to the extent that it has lifted or raised the bunk and, thereby, increased the tipping moment thereof by spacing the bunk further from the rub plates. For this reason, it is a further object of my invention to provide a scale or weighing device which is interposed between the bunk and subframe yet which leaves the critical relationship between the bunk and rub plates unaffected or substantially unchanged.

Yet another object of my invention is to provide a weighing device for a logging vehicle in which no delicate springs or intricate mechanical linkage is utilized in order that the rough usage to which a logging vehicle is put will not unduly wear or shorten the lift span of the weighing device.

To the above ends, the weighing device of the instant invention consists of a disk-like registration member which is fixed to and protrudes above the center of the subframe of the logging vehicle and which carries a sealed annular chamber therein. Additionally, a disk-like saucer member is fixed to and made pendent from the center of the bunk imediately above the annular chamber in the registration member. In function, the saucer member bears upon the registration member to compress and to reduce the volume of the sealed annular chamber in direct proportion to the weight of the logs carried by the vehicle. By connecting a pressure indicator gauge to the annular chamber, an accurate indication of the load upon the bunk then may be read. Further, because no springs or intricate mechanical linkages are utilized, severe rough usage of the vehicle itself will not affect the useful life or the operativeness of the weighing device. Further, by correlating the saucer member to the registration member so that these two parts fit together, I can interpose the entire weighing device between the bunk and subframe without varying substantially the critical relationship of the bunk to the rub plates. In this manner, I preserve the original alignment of these latter elements and do not increase the tipping moment of the vehicle itself.

These and other objects and advantages of my invention will be set forth in the following detailed description, taken in conjunction with the accompanying drawing, wherein.

Figure 1:
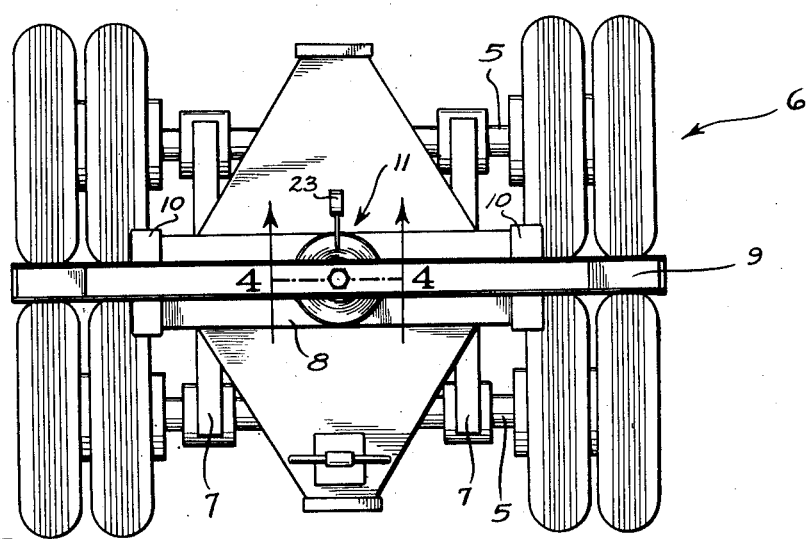
Fig. 1 is a top view of a tandem logging trailer having the weighing device of the present invention installed thereon.
Figure 3:
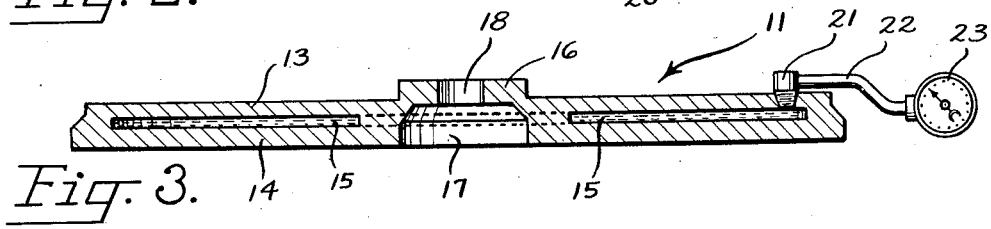
Figure 4:
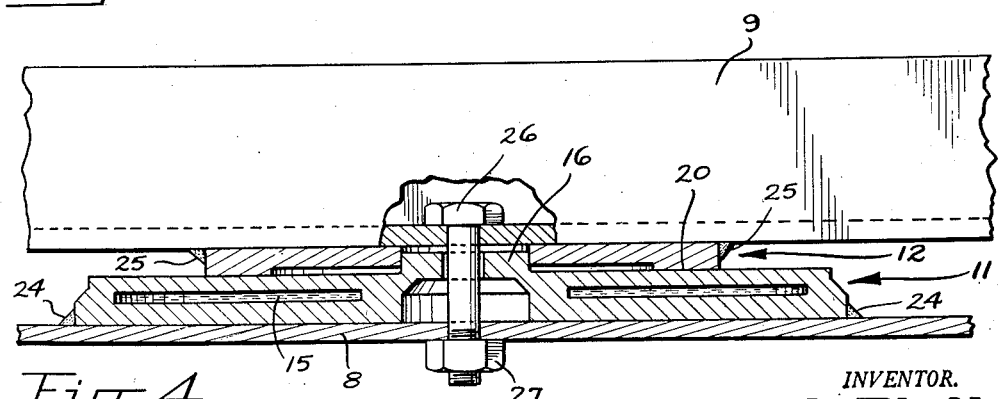

Fig. 3 is a cross section detail of the registration member of the weighing device, a pressure indicator gauge being shown connected with the hollow chamber which is carried within the registration member; and Fig. 4 is partially a cross section and partially a broken view, taken substantially on the line 4—4 of Fig. 1, showing the weighing device in assembled condition and better indicating the manner in which provision is made to accommodate rotational movement between the registration member and saucer member.

To the end that the weighing device of the instant invention may be oriented with respect to the parts of a logging vehicle, I have shown a typical tandem logging trailer in Fig. 1, it being understood that the weighing device may be applied with equal facility and in a similar manner to the truck or power unit of the vehicle. As is conventional, the trailer is provided with two axles 5, each of which carries dual wheels at the ends thereof. Longitudinally, a pair of bolster springs 7 ride on and interconnect the two axles 6, the function of these springs being to carry a subframe structure generally indicated at 8. In a conventional logging vehicle, a lateral load carrying bunk 9 pivotally is mounted upon the center of the subframe 8 and two rub plates 10 help support the bunk when loaded. In this connection, it will be noted that the weighing device of the instant invention is interposed between the bunk 9 and the subframe 8 centrally of the truck or trailer unit substantially without disturbing the previously established alignment of bunk and rub plates.

Figure 2:
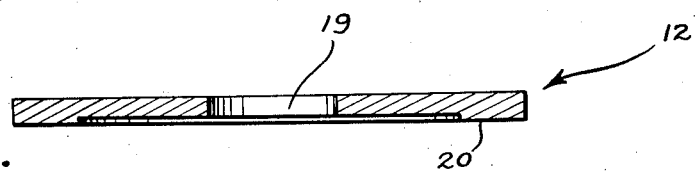
Fig. 2 is a cross section detail of the saucer member, this figure better indicating the depending rim which is pendent from the marginal periphery thereof.

Turning now to the details of the weighing device or scale, the two principal parts include a registration member 11 (see Fig. 3) and a saucer member 12 (see Fig. 2). As the drawings indicate, both of these members are disk-like and annular in confiuration and both are made as thin as is practical in order to occupy the least amount of space intermediate the bunk 9 and the subframe 8.

Referring first to the registration member 11, a pair of disk-like annular plate members 13 and 14 are arranged with the inner and outer peripheral margins thereof in sealed (as by welding) face to face abutment. Additionally, the portions of said plate members lying intermediate the peripheral margins are spaced one from another to define and to bound a compressible annular chamber 15, the upper plate 13 thereafter functioning as a diaphragm. It is this chamber 15 in which air or some other fluid is trapped in order to indicate the weight upon the bunk in accord with the compressive force exerted upon the chamber.

As shown in Fig. 3, an upstanding annular washer 16 is joined to the plate member 13 so as to protrude thereabove. Further, this annular washer and the remainder of the registration member both are pierced by axial apertures, the lower or first axial aperture 17 being somewhat larger in diameter than the upper or second axial aperture 18. Thus, in fabricating the registration member initially, I prefer to utilize two separate plate members 13 and 14 and to weld the inner and outer peripheries thereof before welding the annular washer 16 to the upper one of the plate members. In this manner, the aperture 17 provides sufficient access to the interior of the assembly to allow the initial welding operation to proceed.

Turning now to Fig. 2, the saucer member 12 preferably is formed from one integral disk-like piece. To this end, the annular configuration of the saucer is secured by providing an axial aperture 19 in the center thereof. Further, the peripheral margin of the saucer carries a depending rim portion 20 having a smooth lower surface thereon. As a comparison of Figs. 2 and 3 will indicate, the depending rim 20 is provided with a diameter substantially equal to the medial or median diameter of the annular chamber 15. Further, the diameter of the axial aperture 19 is correlated to the outer peripheral circumference of the washer 16 so that these two parts slidably may fit together one over the other (see Fig. 4).

Before assemblying the weighing device, one of the disk-like plate members of the registration member is pierced by an outlet port and a fitting, such as 21, is secured thereto. Thereafter, a pressure hose 22 having an indicating pressure gauge 23 is secured to the fitting 21. The function of the gauge 23 is to give a reading of the pressure which exists within the hollow annular chamber 15. As is apparent, this gauge may be calculated either in pounds per square inch of pressure or in pounds or tons of weight riding upon the bunk 9 as hereinafter will be explained.

In assembling the weighing device, the registration member 11 preferably is welded to the center of the subframe 8 as indicated at 24 in Fig. 4. In similar manner, the saucer member 12 is welded to the center of the under side of the bunk 9 as indicated at 25. Thereafter, the bunk and saucer are assembled upon the subframe and the registration member with the axial aperture 19 encompassing and rotatably mated to the upstanding annular washer 16. Such an assembly of parts causes the depending rim 20 to overlie the annular chamber 15 as shown in Fig. 4. Accordingly, when the bunk 9 is loaded with logs, the weight thereof is transferred, via the circular depending rim 20, across the annular chamber 15. By flexing, the upper plate member 13 then serves to compress and to reduce the volume of the chamber. The load then becomes apparent in the form of pressure, either fluid or pneumatic, within the annular chamber and the calibrated gauge serves as an indicium.

Having assembled the various elements in place upon the vehicle, a king bolt 26 then is inserted through the various axial apertures and a nut 27 is secured to the end thereof. In actual practice this king bolt and nut are somewhat loosely fitted so the various elements cannot move laterally or longitudinally one over another but the saucer 12 can rotate upon the registration member 11 when the logging truck turns a corner or otherwise is articulated. Because such rotational movement is to be expected, a heavy grease or oil is applied between the saucer and registration members prior to use of the weighing device.

Once a truck and trailer unit are equipped with the invention, the use thereof is apparent. Thus, logs are loaded upon the bunk 9 of the truck and trailer and the weight then is checked with a gauge 23 on each unit. In effect, the weight of the logs is transferred from the bunk 9 to the subframe 8 through the weighing device. This transfer of weight is effected across the depending rim 20 and the annular chamber 15. As the upper plate member 13 is flexed, the pressure within the chamber 15 is increased proportionally and the fitting 21 and pressure hose 22 transfer such increased pressure to the gauge 23. At the gauge, a dial may be provided to read either pounds per square inch of pressure or pounds of weight carried.

In the woods, it heretofore has been accepted practice to load a logging vehicle 15 to 20 percent light in order not to violate the previously mentioned State or Provincial laws. This practice, of course, is costly to the independent contractor who is hauling logs since he is paid by the weight carried. However, in an abundance of caution, a light run has been made both because accurate highway weighing devices are not available in the woods at the loading site and because the loading process must be handled with all possible speed and facility. With the instant invention, however, an immediate indicium of the weight carried by the bunk is available for checking. Accordingly, if the vehicle is overloaded, such immediately is apparent and the truck driver can call for a substitute log or for the removal of one small log. In actual use upon the highways of the State of Oregon, this weighing device allows a logging vehicle to run within 5 percent or less of the permissible maximum gross weight since the accuracy and dependability thereof have proven out under rough and severe usage. Further, because of the novel cooperating arrangement of the saucer and registration members, the space occupied is a minimum and the tipping moment of the bunk is not increased nor is the critical relationship of the bunk to the rub plates disturbed.

I claim:

1. In combination with the bunk and subframe of a wheeled logging vehicle, a weighing device for indicating the load carried upon said bunk, said weighing device including a hollow registration member fixed to and protruding above the center of said subframe, said registration member having abutting upper and lower plate member portions, said plate members being arranged with the inner and outer peripheral margins thereof sealed but with the intermediate portions spaced to bound and to define a sealed annular compression chamber, an upstanding washer arranged concentric said upper plate member and protruding thereabove, said washer having a smaller diameter than either said annular chamber or said registration member, an annular saucer member fixed to and depending from the center of said bunk, said saucer member carrying a pendent circular rim having a diameter smaller than said registration member but larger than said washer, said pendent rim resting upon said upper plate member directly above said annular chamber, a circular aperture axially piercing said saucer member and having a circumference mated to and encompassing the outer peripheral circumference of said annular washer to accommodate relative rotation between the saucer and washer, an axial aperture piercing said bunk, washer, registration member and subframe, and a king bolt means extending through said axial aperture to prevent lateral and longitudinal movement but to accommodate rotational movement of the various weighing device elements.

2. A scale for indicating the weight carried by a logging vehicle, comprising a pair of thin disk-like annular plate members arranged with the inner and outer peripheral margins thereof in sealed face to face abutment to define an annular registration member, the face portions of said plate members lying intermediate said peripheral margins being spaced one from another and bounding a compressible annular chamber, a single outlet port piercing one of said plate members and communicating with said annular chamber, a first axial aperture piercing said registration member and extending completely therethrough, an upstanding annular washer pierced by a second axial aperture and joined to one face of said registration member concentric said first axial aperture, said washer protruding above said one face and having a smaller diameter than said registration member, a thin annular saucer member larger in diameter than said washer but smaller than said registration member and carrying a depending rim portion about the outer peripheral margin thereof, said depending rim being adapted to rest upon said registration member one face immediately above the center of said compressible annular chamber, a pressure indicating means connected with said single outlet port to indicate the compressive force exerted upon said chamber by said depending rim, said registration member and said rim having smooth abutting surfaces to accommodate relative rotation therebetween, said saucer member being pierced by a third axial aperture which is complementary to and in which said washer rotatably is received, and a king bolt extending through all of said axial apertures loosely to tie the various elements together while accommodating relative rotational movement between said saucer and said registration member.

References Cited in the file of this patent

UNITED STATES PATENTS

| Number | Name | Date |
| --- | --- | --- |
| 2,365,589 | Poston et al. | Dec. 19, 1944 |
| 2,592,501 | Williams | Apr. 8, 1952 |

FOREIGN PATENTS

| Number | Country | Date |
| --- | --- | --- |
| 398,687 | Great Britain | Sept. 21, 1933 |
| 195,793 | Great Britain | Sept. 21, 1933 |